United States Patent
Yanai et al.

(10) Patent No.: US 9,535,289 B2
(45) Date of Patent: Jan. 3, 2017

(54) BRIGHTNESS ENHANCEMENT FILM, POLARIZING PLATE AND IMAGE DISPLAY DEVICE

(71) Applicant: FUJIFILM Corporation, Tokyo (JP)

(72) Inventors: Yujiro Yanai, Kanagawa (JP); Hiroshi Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 118 days.

(21) Appl. No.: 14/681,679

(22) Filed: Apr. 8, 2015

(65) Prior Publication Data

US 2015/0293392 A1 Oct. 15, 2015

(30) Foreign Application Priority Data

Apr. 9, 2014 (JP) .................. 2014-080597

(51) Int. Cl.
*G02B 5/30* (2006.01)
*G02F 1/13363* (2006.01)
*G02F 1/1335* (2006.01)
*G02B 5/04* (2006.01)

(52) U.S. Cl.
CPC .......... *G02F 1/13363* (2013.01); *G02B 5/045* (2013.01); *G02B 5/3016* (2013.01); *G02F 1/133528* (2013.01)

(58) Field of Classification Search
CPC .................................................. G02B 5/3016
USPC ........................................................ 349/194
See application file for complete search history.

(56) References Cited

U.S. PATENT DOCUMENTS

| | | | | |
|---|---|---|---|---|
| 4,525,413 A * | 6/1985 | Rogers | ..................... | G02B 1/08 264/2.7 |
| 5,486,940 A * | 1/1996 | Fergason | ............. | G02B 5/3016 349/122 |
| 6,024,455 A * | 2/2000 | O'Neill | .................. | G02B 5/124 283/85 |
| 2002/0167725 A1* | 11/2002 | Goto | ..................... | G03B 21/625 359/456 |
| 2005/0195340 A1* | 9/2005 | Lazarev | ............. | G02F 1/13362 349/62 |
| 2007/0153377 A1* | 7/2007 | Goto | ..................... | G02B 5/045 359/460 |
| 2008/0137222 A1* | 6/2008 | Park | ................. | B29D 11/00634 359/885 |

(Continued)

FOREIGN PATENT DOCUMENTS

JP     H08-190806 A     7/1996

*Primary Examiner* — Nimeshkumar Patel
*Assistant Examiner* — Christopher Raabe
(74) *Attorney, Agent, or Firm* — Jean C. Edwards, Esq.; Edwards Neils LLC

(57) ABSTRACT

An aspect of the present invention relates to a brightness enhancement film, wherein a high refractive index layer and a low refractive index layer with an average refractive index that is lower than that of the high refractive index layer are directly laminated, and which includes a concavo-convex shape including concave portions and convex portions in an interface shape of an interface between the high refractive index layer and the low refractive layer, with the high refractive index layer including a lyotropic liquid-crystalline compound, and an outermost surface on the low refractive index layer side being a flat surface.

20 Claims, 3 Drawing Sheets

(56) References Cited

U.S. PATENT DOCUMENTS

2008/0273144 A1* 11/2008 Yao ...................... G02B 3/0037
349/64
2012/0286258 A1* 11/2012 Naraoka ................ C09K 11/06
257/40
2014/0353645 A1* 12/2014 Jeong .................. H01L 51/5275
257/40
2015/0102327 A1*  4/2015 Kim .................... H01L 51/5281
257/40
2015/0293391 A1* 10/2015 Yanai .................. G02F 1/13363
349/96

* cited by examiner (a)

(b)

(a)

(b)

(c)

(a)

(b)

BRIGHTNESS ENHANCEMENT FILM, POLARIZING PLATE AND IMAGE DISPLAY DEVICE

CROSS-REFERENCE TO RELATED APPLICATIONS

This application claims priority under 35 U.S.C 119 to Japanese Patent Application No. 2014-080597 filed on Apr. 9, 2014. The above application is hereby expressly incorporated by reference, in its entirety, into the present application.

BACKGROUND OF THE INVENTION

Field of the Invention

The present invention relates to a brightness enhancement film, a polarizing plate comprising the brightness enhancement film, and an image display device.

Discussion of the Background

Image display devices such as liquid crystal display devices (also referred to as "LCDs" hereinafter) normally comprise at least an image display element such as a liquid crystal cell and a backlight unit.

As the energy consumption of backlight units has been reduced, it has been proposed that an optical sheet capable of enhancing brightness (the degree of brightness per unit area) be disposed between the backlight unit and the image display element to increase the rate of use of the light emitted by the light source contained in the backlight unit. Such an optical sheet is called a brightness enhancement film. The brightness enhancement film is expected to become core parts of low power image display devices as mobile devices increase in number and the power consumption of household appliance products decreases.

An optical sheet, commonly called a prism sheet, in the surface of which is formed a concavo-convex shape through which light that has entered through a backlight unit exits, has been proposed as a brightness enhancement film (for example, see Japanese Unexamined Patent Publication (KOKAI) Heisei No. 8-190806, which is expressly incorporated herein by reference in its entirety). Such prism sheets are available in the form of commercial products.

SUMMARY OF THE INVENTION

The prism sheet is an optical sheet that is capable of enhancing brightness in that the concavo-convex shape formed on the exit surface condenses light entering through the backlight unit toward the image display element side. However, since light is condensed in a specific direction by the concavo-convex shape in the exit surface, the brightness may decrease markedly in directions different from the direction in which the light is condensed. Normally, the front brightness is greatest on the display surface, with the brightness gradually decreasing as the viewing angle increases. However, for example, in an image display device equipped with a prism sheet in which is formed concavo-convex shape with of convex portions of triangular cross section, the brightness may loss sharply to nearly zero relative to the front brightness at a lateral ultra corner of 45°. Such partial losses in brightness may cause the user who is viewing an image displayed on the image display device to experience discomfort, and their reduction is desirable.

An aspect of the present invention provides for a means of preventing partial losses in brightness on the display surface of an image display device while achieving enhanced brightness.

The present inventors conducted extensive research into finding a means of condensing light without providing a concavo-convex shape in the exit surface. As a result, they discovered a brightness enhancement film wherein a high refractive index layer and a low refractive index layer with an average refractive index that is lower than that of the high refractive index layer are directly laminated, and which comprises a concavo-convex shape comprised of concave portions and convex portions in an interface shape of an interface between the high refractive index layer and the low refractive layer, with the high refractive index layer comprising a lyotropic liquid-crystalline compound, and an outermost surface on the low refractive index layer side being a flat surface. That is, the present inventors discovered as a result of extensive research that an image display device equipped with such a brightness enhancement film could achieve brightness enhancement while preventing the partial losses in brightness that may occur in image display devices equipped with conventional prism sheets.

The following is conjecture by the present inventors and is not to be construed as limiting the present invention. The present inventors presume that the great condensing of entering light as it enters the low refractive index layer from the high refractive index layer containing a lyotropic liquid-crystalline compound is the reason that enhanced brightness can be achieved by the above brightness enhancement film in which the exit surface side (outermost surface on the low refractive index layer side) that is to prevent the partial drop in brightness is a flat surface. In this regard, the present inventors presume that the lyotropic liquid-crystalline compound contained in the high refractive index layer and the concavo-convex shape at the interface can contribute to enhancing the efficiency of condensing of light.

In the present invention, direct lamination of the high refractive index layer and low refractive index layer means that the two layers are in direct contact without an intermediate layer such as an adhesion-enhancing layer or adhesive layer being sandwiched between them. Bringing the two layers into direct contact in this fashion is thought to achieve a high light condensing effect at the interface between the two layers.

In the present invention, the term "flat surface" means a surface having a degree of flatness such that the arithmetic average roughness Ra on the roughness curve is equal to or less than 0.25 μm. The term Ra, which is specified in JIS B 0601, is the average of the absolute value of height Z at various points along a reference length L and is defined by the following equation:

$$Ra = \frac{1}{L}\int_0^L |Z(x)|dx$$

Examples of measurement methods are the stylus method and the optical method. For example, the Ra can be measured using the no surface contact, layer sectional contour measuring system VertScan (made by Ryoka Systems, Inc.).

Accordingly, the outermost surface on the low refractive index layer side of a flat surface means that the Ra of the outermost surface on the low refractive index layer side is equal to or less than 0.25 μm. The Ra can be equal to or higher than 0 μm. For example, it can be equal to or higher than 0.01 μm, or equal to or higher than 0.05 μm. The outermost surface on the low refractive index layer side is the exit surface through which light that has entered the brightness enhancement film exits in an image display device equipped with the above brightness enhancement film. The present inventors presume that the fact that this exit surface is a surface having the above flat surface property can contribute to suppressing the partial drop in brightness that may occur in image display devices equipped with conventional prism sheets.

In the present invention, the term "lyotropic liquid crystallinity" means the property whereby changing the temperature and/or concentration in a solution state in the presence of a solvent causes an isotropic phase—liquid-crystalline phase shift. Accordingly, a layer containing a liquid crystal phase (liquid-crystal layer) can be formed using a coating liquid in the form of a solution at a concentration and temperature at which the lyotropic liquid-crystalline compound is present as a liquid crystal phase. When a solution at a concentration and temperature at which the lyotropic liquid-crystalline compound cannot exist as a liquid-crystal phase is used as a coating liquid, a layer in which the lyotropic liquid-crystalline compound is present as an isotropic phase, not as a liquid-crystal phase, is formed. Lyotropic liquid-crystalline compounds will be described in detail further below.

In an embodiment, the average refractive index of the high refractive index layer is equal to or higher than 1.80 but equal to or less than 2.50.

In the present invention, the average refractive index of a given layer refers to the average value of the refractive index in the in-plane direction and the refractive index in the thickness direction. The refractive indexes in the various directions can be measured by known refractive index measuring apparatus. An example of a refractive index measuring apparatus is the DR-M2 multi-wavelength Abbe refractometer made by Atago. In the present invention, the term "refractive index" refers to the refractive index of light with a wavelength of 550 nm In an embodiment, in the above concavo-convex shape, a distance between bottoms of the concave portions of two adjacent concave portions separated by the convex portion ranges from 1 to 200 µm, and an inner angle at a tip of the convex portion of a triangle formed by connecting the tip of the convex portion and the bottoms of the concave portions of two adjacent concave portions being separated by the convex portion ranges from 50 to 100°. These convex portions and concave portions refer to portions that appear as convex portions and concave portions when the high refractive index layer side is viewed on the lower side and when the low refractive index layer side is viewed on the upper side.

In an embodiment, the average refractive index of the low refractive index layer is equal to or higher than 1.00 but less than 1.80.

In an embodiment, the average refractive index difference between the high refractive index layer and the low refractive index layer is equal to or higher than 0.05.

In an embodiment, the low refractive index layer is a cured layer formed of a curable composition.

In an embodiment, the concavo-convex shape is formed by two-dimensionally disposing, on the interface, a shape selected from the group consisting of a polygonal pyramid shape, a conical shape, a partial spheroid shape, and a partial spherical shape.

In another embodiment, the concavo-convex shape is formed by one-dimensionally disposing, on the interface, a shape selected from the group consisting of a partial cylindrical shape, a partial elliptical cylinder shape, and a prismatic shape.

In this context, the term "one-dimensionally disposing" refers to disposing the above shape in just one direction of the interface, that is, in parallel. By contrast, the term "two-dimensionally disposing" refers to disposing the above shape in two or more dimensions of the interface. For example, it includes embodiments in which the shape is disposed in two directions: a given direction and a direction perpendicular to that direction. It is not limited to embodiments in which the shape is regularly formed, but includes random formations.

In the present invention and the present specification, description relating to angles, such as "perpendicular" and "parallel," is to be interpreted as including the scope of error that is permitted in the field of art to which the invention belongs. For example, it means falling within a range of less than ±10° of the exact angle. The error with the exact angle is desirably equal to or less than 5°, preferably equal to or less than 3°.

In an embodiment, in the concavo-convex shape, a sectional shape of convex portions is a triangular shape.

A further aspect of the present invention relates to a polarizing plate comprising the above brightness enhancement film and a polarizer layer.

In an embodiment, the polarizing plate is a backlight-side polarizing plate.

A further aspect of the present invention relates to an image display device, comprising an image display element and a backlight unit, and comprising the above brightness enhancement film between the image display element and the backlight unit.

In an embodiment, the image display element is a liquid crystal cell positioned between a viewing-side polarizing plate and a backlight-side polarizing plate, with the backlight-side polarizing plate comprising a polarizer layer and the above brightness enhancement film.

In an embodiment, the brightness enhancement film is contained at a position closer to a backlight side than the polarizer layer in the backlight-side polarizing plate.

An aspect of the present invention can provide a brightness enhancement film that is capable of enhancing brightness while reducing partial losses in brightness on the display surface of an image display device.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
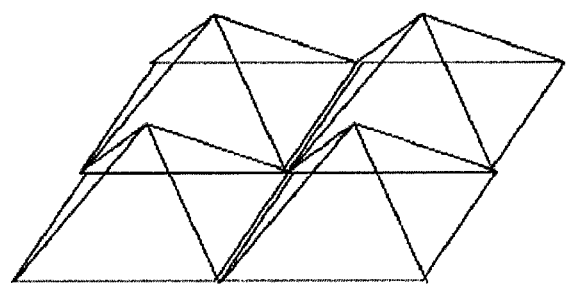
FIG. 1 is a schematic drawing showing an example of the concavo-convex shape formed at the interface of a high refractive index layer and a low refractive index layer of the brightness enhancement film according to an aspect of the present invention.
Figure 1:
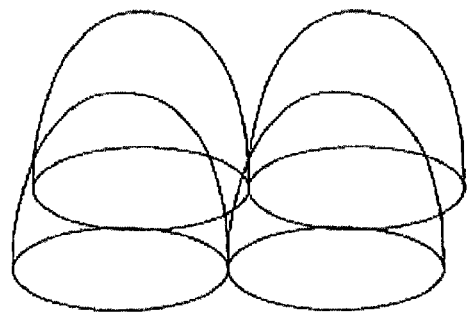

The description given below is based on representative forms of implementing the present invention. The present invention is not limited to such implementation forms. In the present invention and present specification, a numeric range denoted using the word "to" means a range that includes the preceding and succeeding numeric values as a lower limit and upper limit, respectively.

Brightness Enhancement Film

The brightness enhancement film according to an aspect of the present invention is a brightness enhancement film, wherein a high refractive index layer and a low refractive index layer with an average refractive index that is lower than that of the high refractive index layer are directly laminated, and which comprises a concavo-convex shape comprised of concave portions and convex portions in an interface shape of an interface between the high refractive index layer and the low refractive layer, with the high refractive index layer comprising a lyotropic liquid-crystalline compound, and an outermost surface on the low refractive index layer side being a flat surface.

The term "brightness enhancement film" refers to a functional film that can exhibit a function of enhancing the brightness of the display surface of an image display device relative to the case when the film is not present. The brightness enhancement film according to an aspect of the present invention desirably functions as a light-condensing sheet that is capable of producing a light-condensing effect. More particularly, it is capable of condensing light entering from the backlight unit toward the image display element side, thereby enhancing the brightness of the display surface of the image display device.

The above brightness enhancement film will be described in greater detail.

<High Refractive Index Layer>

(Lyotropic Liquid-Crystalline Compound)

The high refractive index layer of the brightness enhancement film contains a lyotropic liquid-crystalline compound. The properties of lyotropic liquid crystallinity are as set forth above. The term "lyotropic liquid-crystalline compound" is a liquid-crystal compound possessing such properties. The lyotropic liquid-crystalline compound does not have to exhibit liquid-crystalline properties in the high refractive index layers formed using this compound. One type of lyotropic liquid-crystalline compound can be contained in the high reflective index layers, or two or more such compounds of differing structure can be contained therein.

The liquid-crystalline phase that is expressed by the lyotropic liquid-crystalline compound is not specifically limited. It is desirably a nematic liquid-crystalline phase or a smectic liquid-crystalline phase.

Examples of lyotropic liquid-crystalline compounds are azo compounds, anthraquinone compounds, perylene compounds, quinophthalone compounds, naphthoquinone compounds, and metallocyanine compounds. However, any compound that exhibits lyotropic liquid-crystalline properties will do, and use is not limited to the above compounds. Specific examples are the organic compounds denoted by general structural formulas I and II described in Japanese Translated PCT Patent Application Publication (TOKUHYO) No. 2012-500316, which is expressly incorporated herein by reference in its entirety. Reference can be made to paragraphs 0031 to 0086 and Examples of Japanese Translated PCT Patent Application Publication (TOKUHYO) No. 2012-500316 for details regarding the structures and synthesis methods of these organic compounds.

In an embodiment, examples of lyotropic liquid-crystalline compounds are compounds having one or more of the following structures:

a structure comprising two or more arylene groups;

a structure comprising two or more arylene groups, with a divalent connecting group denoted by —NH—C(=O)— being present between the two arylene groups; and a structure comprising one or more arylene groups substituted with one or more substituents selected from the group consisting of sulfonic acid groups (—$SO_3H$) and sulfonic acid alkali metal salt groups (—$SO_3M$, where M denotes an alkali metal atom).

The above arylene groups are, for example, arylene groups with 6 to 30 carbon atoms, desirably arylene groups with 6 to 14 carbon atoms, and preferably, arylene groups with 6 to 10 carbon atoms. Specific examples are phenylene groups and naphthalene groups.

In the present invention, unless specifically stated otherwise, the groups that are mentioned can be substituted or unsubstituted. When a given group comprises at least a substituent, examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups. Accordingly, the above arylene groups can comprise one or more substituents. Specific examples of the substituents have been given above. As set forth above, the sulfonic acid groups and sulfonic acid alkali metal salt groups can be substituted. The number of substituents selected from the group consisting of sulfonic acid groups and sulfonic acid alkali metal salt groups that are substituted on a single arylene group is, for example, 1 to 3, and desirably 1. In the present invention, the "number of carbon atoms" of a group having a substituent means the number of carbon atoms of the portion without the substituent.

Examples of lyotropic liquid-crystalline compounds are compounds that have, or do not have, one or more of the above structures, and which have a structure comprising one or more divalent heterocyclic groups. Examples of divalent heterocyclic groups are desirably divalent heterocyclic groups having 1 to 26 carbon atoms, preferably divalent heterocyclic groups having 1 to 24 carbon atoms, more preferably five-membered or six-membered divalent heterocyclic groups. The hetero ring that is contained in the heterocyclic group can be a single ring or a fused ring. Examples of divalent heterocyclic groups are benzimidazolone groups, triazine groups, pyrimidine groups, quinoxaline groups, anthraquinone groups, quinophthalone groups, and benzophenone groups.

The lyotropic liquid-crystalline compound can be a polymer comprising two or more identical structural units (repeating units) or a copolymer comprising two or more different repeating units. The molecular weight of the lyotropic liquid-crystalline compound is, for example, equal to or higher than 5,000 but equal to or less than 10,000,000; there is no specific limitation. The term "molecular weight," in the case of a polymer or copolymer, refers to the weight average molecular weight, obtained by measurement by gel permeation chromatography (GPC) and standard polystyrene conversion. The measurement can be conducted under the conditions given in Examples further below, for example.

A compound containing a polymerizable group (polymerizable compound) can be employed as the lyotropic liquid-crystalline compound. The polymerizable group is not specifically limited. Examples are radical polymerizable groups and cationic polymerizable groups. Examples of radical polymerizable groups are (meth)acryloyl groups, (meth) acryloyloxy groups, vinyl groups, styryl groups, and allyl groups. Examples of cationic polymerizable groups are vinyl ether groups, oxiranyl groups, and oxetanyl groups. The term (meth)acryloyl group" is a concept that includes both acryloyl groups and methacryloyl groups. The same applies to (meth)acryloyloxy groups. When the lyotropic liquid-crystalline compound is a polymerizable compound, one or more polymerizable groups can be contained per molecule.

The lyotropic liquid-crystalline compound can be synthesized by known methods and is available in the form of commercial products.

(Average Refractive Index)

The high refractive index layer that contains the lyotropic liquid-crystalline compound is a layer of higher average refractive index than the low refractive index layers on which it is directly laminated. The presence of an average refractive index difference between the two layers in this manner and the presence of the concavo-convex shape at the interface between these two layers are thought to condense light at the interface in the exit direction. The present inventors presume that this can contribute to enhancing brightness. From the perspective of achieving a better brightness-enhancing effect, the average refractive index of the high refractive index layers is desirably equal to or higher than 1.80, preferably equal to or higher than 2.0. From the perspective of inhibiting reflection at the interface between the high refractive index layer and air, the average refractive index of the high refractive index layer is desirably equal to or less than 2.50, preferably equal to or less than 2.30. The average refractive index of the high refractive index layer is normally determined by the type of lyotropic liquid-crystalline compound. Thus, it suffices to select a lyotropic liquid-crystalline compound that permits the formation of a high refractive index layer having the desired average refractive index.

(Lyotropic Liquid-Crystalline Composition (Coating Liquid))

The high refractive index layer set forth above can be fabricated by coating a coating liquid containing a lyotropic liquid-crystalline compound (lyotropic liquid-crystalline composition) on a surface being coated. A single type of lyotropic liquid-crystalline compound can be employed, or a combination of two or more having different structures can be employed. The details of the coating process and the like are set forth further below. The lyotropic liquid-crystalline composition can be prepared by admixing to the lyotropic liquid-crystalline compound with various additives and solvents as needed. Additives in the form of wavelength dispersion-controlling agents, optical characteristic modifiers, surfactants, adhesion enhancers, lubricants, orientation-controlling agents, UV absorbers, and other known additives that are commonly employed in liquid-crystalline compositions, can be employed without limitation.

Examples of the solvent are water, dimethyl formamide, and other polar solvents; and hexane and other nonpolar solvents. These can be used singly or in any combination of two or more in any ratio. The solvent is desirably polar solvent, preferably water. As needed, acids and bases can be added to regulate the ion strength and pH.

The concentration of the lyotropic liquid-crystalline compound in the lyotropic liquid-crystalline composition is about 1 to 50 weight percent, for example. It suffices for the concentration to be determined based on the lyotropic liquid-crystalline compound to undergo an isotropic phase—liquid crystalline phase shift. The concentration can be determined based on the type of lyotropic liquid-crystalline compound employed, and is not limited to the above range. The lyotropic liquid-crystalline composition is desirably used at a concentration outside the concentration range at which it undergoes an isotropic phase—liquid crystalline phase shift. The temperature of the lyotropic liquid-crystalline composition during coating can be, for example, about 20 to 100° C. However, it suffices to determine the temperature by taking into account temperatures that permit the lyotropic liquid-crystalline composition to undergo an isotropic phase—liquid crystalline phase shift, and this range is not a limitation. The lyotropic liquid-crystalline composition is desirably employed at a temperature outside the temperature range at which the lyotropic liquid-crystalline compound undergoes an isotropic phase—liquid-crystalline phase shift. That is, it is desirable for the lyotropic liquid-crystalline compound to be present in the high refractive index layer as an isotropic phase and to not express a liquid-crystalline phase. Whether the lyotropic liquid-crystalline compound is present in the high refractive index layer as a liquid crystal phase or as an isotropic phase can be determined by texture observation with a polarizing microscope. The presence of the lyotropic liquid-crystalline compound as an isotropic phase in the high refractive index layer is advantageous in terms of inhibiting anisotropic scattering. Inhibiting anisotropic scattering is thought to permit an even higher light condensing rate by the brightness enhancement film.

<Low Refractive Index Layer>

The low refractive index layer need only be a layer of lower average refractive index than the high refractive index layer, and is not specifically limited. The average refractive index difference between the high refractive index layer and the low refractive index layer is desirably equal to or higher than 0.05, preferably equal to or higher than 0.10, more preferably equal to or higher than 0.20, still more preferably equal to or higher than 0.30, yet still more preferably equal to or higher than 0.35, and even more preferably, equal to or higher than 0.40. The average difference between the high refractive index layer and the low refractive index layer is, for example, equal to or less than 1.00. However, from the perspective of enhancing light condensing efficiency, the higher the better, and there is no specific limitation.

The average refractive index of the low refractive index layer is desirably less than 1.80, preferably equal to or less than 1.75, still more preferably equal to or less than 1.70, and yet still more preferably, equal to or less than 1.65. The difference in the average refractive index between the high refractive index layer and the low refractive index layer is desirably large from the perspective of enhancing light condensing efficiency. A low average refractive index in the low refractive index layer is desirable to increase the average refractive index difference with the high refractive index layer. The refractive index of the low refractive index layer is desirably equal to or higher than 1.00, preferably equal to or higher than 1.10, from the perspective of inhibiting interface reflection between the low refractive index layer and the other layer adjacent to the low refractive index layer on the exit surface side (such as a polarizer layer, described further below) or air. The average refractive index of the low refractive index layer can be adjusted based on the components employed to form the layer, such as the type of resin and curable compounds set forth further below.

From the perspective of facilitating the formation of the concavo-convex shape, described further below, the low refractive index layer is desirably a resin layer the main component of which is a resin. In this context, the term "main component" means that a resin is the component that is present in the greatest quantity among the components constituting the layer. One or more resins can be contained. The quantity of resin in a resin layer is, for example, equal to or more than 50 weight percent, desirably equal to or more than 70 weight percent, of the total weight of the resin layer. The quantity of resin in the resin layer is, for example, equal to or less than 99 weight percent, or equal to or less than 95 weight percent, of the total weight of the resin layer. However, it can also be 100 weight percent.

In an embodiment, the low refractive index layer can be a thermoplastic resin layer. Examples of thermoplastic resins are polymethyl methacrylate resin (PMMA), polycarbonate resin, polystyrene resin, polymethacryl styrene (MS) resin, acrylonitrile styrene (AS) resin, polypropylene resin, polyethylene resin, polyethylene terephthalate resin, polyvinyl chloride resin (PVC), cellulose acylate, cellulose triacetate, cellulose acetate propionate, cellulose diacetate, thermoplastic elastomer, copolymers thereof, and cycloolefin polymers.

From the perspective of facilitating layer formation, the resin layer is desirably a curable layer formed by subjecting a curable composition to a curing treatment. The curable composition can be a photocurable composition that is cured by irradiation with light or a thermosetting composition that is cured by heating. From the perspective of enhancing productivity and being able to rapidly complete the curing process, photocurable compositions are desirable. Examples of curable compositions are curable compositions containing (meth)acrylates. In this context, the term, (meth)acrylates is used to include both acrylates and methacrylates. Specific examples are compositions containing curable compounds such as: phenoxyethyl(meth)acrylate, phenoxy-2-methyl ethyl(meth)acrylate, phenoxyethoxyethyl(meth)acrylate, 3-phenoxy-2-butoxypropyl (meth)acrylate, 2-phenylphenoxyethyl(meth)acrylate, 4-phenylphenoxyethyl(meth)acrylate, 3-(2-phenylphenyl)-2-hydroxypropyl (meth)acrylate, (meth)acrylate of p-cumylphenol reacted with ethylene oxide, ethylene oxide adduct of bisphenol A (meth)acrylic acid ester, propylene oxide adduct of bisphenol A (meth)acrylic acid ester, bisphenol A epoxy (meth) acrylate obtained by an epoxy ring-opening reaction of bisphenol A diglycidyl ether and (meth)acrylic acid, and bisphenol F epoxy (meth)acrylate obtained by an epoxy ring-opening reaction of bisphenol F glycidyl ether and (meth)acrylic acid.

<Concavo-Convex Shape of the Interface>

The above brightness enhancement film contains a concavo-convex shape that is formed of concave portions and convex portions as the interface shape of the interface between the high refractive index layer and the low refractive index layer set forth above. Light that enters the above brightness enhancement film from a backlight unit, in the course of entering a low refractive index layer from a high refractive index layer, can be condensed by being refracted at the interface by the difference in the refractive indexes of the two layers, and is thought to be further condensed by the presence of the concavo-convex shape at the interface. The present inventors presume this to be the reason that in the above brightness enhancement film, a brightness enhancement function can be achieved even when the concavo-convex shape is not provided on the outermost surface on the low refractive index side serving as the exit surface. From the perspective of further enhancing brightness, this concavo-convex shape is desirably a shape in which the distance between the bottoms of the concave portions of two adjacent concave portions separated by the convex portion ranges from 1 to 200 μm, and the inner angle at a tip of the convex portion of a triangle formed by connecting the tip of the convex portion and the bottoms of the concave portions of two adjacent concave portions being separated by the convex portion ranges from 50 to 100°. From the perspective of light condensing efficiency, this shape is preferably a shape in which the distance between the bottoms of the concave portions of two adjacent concave portions separated by the convex portion ranges from 5 to 100 μm, and the inner angle at a tip of the convex portion of a triangle formed by connecting the tip of the convex portion and the bottoms of the concave portions of two adjacent concave portions being separated by the convex portion ranges from 60 to 90°.

The concavo-convex shape will be described in greater detail with reference to the drawings.

The concavo-convex shape is desirably formed of multiple concave portions and multiple convex portions. In an embodiment, the concavo-convex shape thus formed is comprised of a shape disposed two dimensionally at the interface of the high refractive index layer and the low refractive index layer. FIG. 1 is a schematic drawing of the concavo-convex shape comprised of a two-dimensionally disposed shape. The number of shapes in the drawing is four. This is merely an example; the present invention is not limited to the embodiment shown in the drawing. The same applies to the other drawings.

FIG. 1(a) shows a concavo-convex shape formed by two-dimensionally arranging multiple instances of a quadrangular pyramidal shape. FIG. 1(b) shows a concavo-convex shape formed by arranging multiple instances of a partial spheroid shape. Specific examples of two-dimensionally arranged shapes are polygonal pyramidal shapes other than quadrangular pyramidal shapes, conical shapes, and partial spherical shapes. The term "partial spheroid shape" refers to a shape in the form of a spheroid with a portion cut away. An example, as shown in FIG. 1(b), is a semi-spheroid shape in the form of a spheroid half of which has been cut off in the short axis direction. The same applies to partial spherical shapes.

Figure 2:
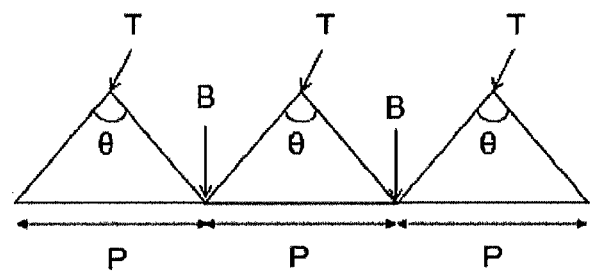
FIG. 2 is a descriptive drawing of the concavo-convex shape.
Figure 2:
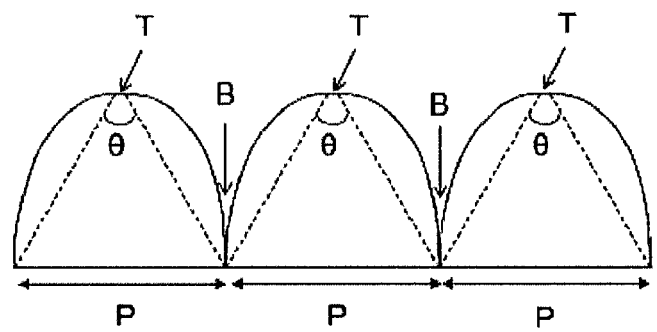
Figure 2:
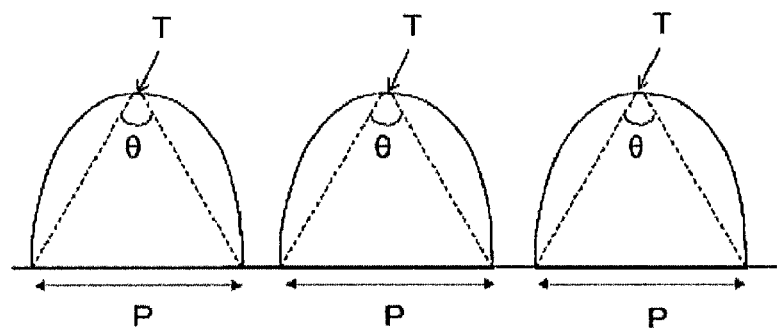

Taking the example of the shapes shown in FIGS. 1(a) and (b), FIG. 2 shows descriptive drawings of "the distance between the bottoms of the concave portions of two adjacent concave portions separated by the convex portion" and "the inner angle at a tip of the convex portion of a triangle formed by connecting the tip of the convex portion and the bottoms of the concave portions of two adjacent concave portions being separated by the convex portion". As shown in FIG. 2, "the distance between the bottoms of the concave portions of two adjacent concave portions separated by the convex portion" and "the inner angle at a tip of the convex portion of a triangle formed by connecting the tip of the convex portion and the bottoms of the concave portions of two adjacent concave portions being separated by the convex portion" are determined by cross sections containing vertical lines running through the tips of the convex portion.

FIG. 2(a) is a partial sectional view of the concavo-convex shape formed by arranging multiple instances of the quadrangular pyramidal shape shown in FIG. 1(a). The "distance between the bottoms of the concave portions of two adjacent concave portions separated by the convex portion" refers to the distance P between the bottoms of the concave portions indicated by the letter B in FIG. 2(a). The "inner angle at a tip of the convex portion of a triangle formed by connecting the tip of the convex portion and the bottoms of the concave portions of two adjacent concave portions being separated by the convex portion" refers to the inner angle θ at the tip T of the convex portion of the triangle formed by connecting the tip of the convex portion denoted by the letter T and the two bottoms B of the concave portions.

FIG. 2(b) is a partial sectional view of the concavo-convex shape formed by arranging multiple instances of the semi-spheroid shape shown in FIG. 1(b). The "distance between the bottoms of the concave portions of two adjacent concave portions separated by the convex portion" refers to the distance P between the bottoms of the concave portions indicated by the letter B in FIG. 2(b). The "inner angle at a tip of the convex portion of a triangle formed by connecting the tip of the convex portion and the bottoms of the concave portions of two adjacent concave portions being separated by the convex portion" refers to the inner angle θ at the tip T of the convex portion of the triangle formed by connecting the tip of the convex portion denoted by the letter T and the two bottoms B of the concave portions.

As shown in FIG. 2(c), in the case where the bottom of the concave portion is a flat surface, the distance between the two points where the bottom surface of the concave portion intersects the bottom surface of the convex portion is specified as the "distance between the bottoms of the concave portions of two adjacent concave portions separated by the convex portion". In that case, the inner angle θ at the tip T of the convex portion of the triangle formed by connecting these two points and the tip T of the convex portion becomes the "inner angle at the tip of the convex portion of a triangle formed by connecting the tip of the convex portion and the bottoms of the concave portions of two adjacent concave portions being separated by the convex portion".

There are some instances in which multiple different shapes are present as cross section containing the vertical line passing through tip T of the convex portion. For example, in the quadrangular pyramidal shape shown in FIG. 1(a), the cross section passing through the tip and the diagonal line of the bottom differs in shape from the cross section passing through the tip and the center points of two opposing sides. In the latter, the "distance between the bottoms of the concave portions of two adjacent concave portions separated by the convex portion" is minimized. When there are multiple cross-sectional shapes in this manner, the "distance between the bottoms of the concave portions of two adjacent concave portions separated by the convex portion" and the "inner angle at the tip of the convex portion of a triangle formed by connecting the tip of the convex portion and the bottoms of the concave portions of two adjacent concave portions being separated by the convex portion" are to be specified in the cross section in which the "distance between the bottoms of the concave portions of two adjacent concave portions separated by the convex portion" is minimized.

Figure 3:
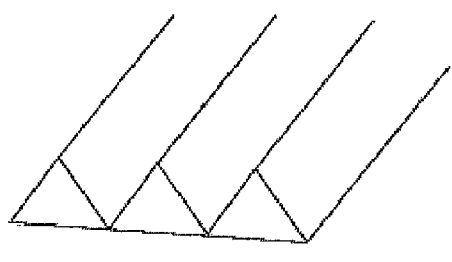
FIG. 3 is a schematic drawing showing an example of the concavo-convex shape formed at the interface of a high refractive index layer and a low refractive index layer of the brightness enhancement film according to an aspect of the present invention.
Figure 3:
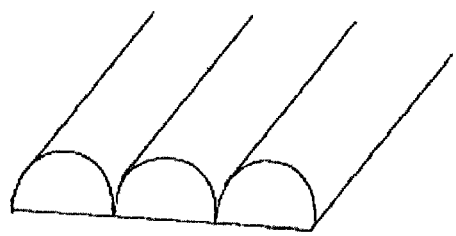

A concavo-convex shape formed with a two-dimensionally disposed shape has been described above. However, the concavo-convex shape that is contained in the above interface shape can also be formed by a shape formed with a one-dimensionally disposed shape. FIG. 3 shows a specific example of such as shape.

FIG. 3 is a schematic drawing of a concavo-convex shape that is formed with a one-dimensionally disposed shape. FIG. 3(a) shows a concavo-convex shape in which multiple instances of a triangular prism shape are one-dimensionally disposed. FIG. 3(b) shows a concavo-convex shape in which multiple instances of a partial cylindrical shape are one-dimensionally disposed. Specific examples of one-dimensionally disposed shapes are polygonal prism shapes other than triangular prisms and partial elliptical cylinder shapes.

The term "partial cylindrical shape" refers to a shape in which a cylinder is partially cut away in the major axis direction. An example, as shown in FIG. 3(b), is a semi-cylindrical shape in which a cylinder is cut in half in the major axis direction. The same applies to partial elliptical cylinder shapes. In a shape that is one-dimensionally disposed, the "distance between the bottoms of the concave portions of two adjacent concave portions separated by the convex portion" and the "inner angle at a tip of the convex portion of a triangle formed by connecting the tip of the convex portion and the bottoms of the concave portions of two adjacent concave portions being separated by the convex portion" can be determined as set forth above.

In both the concavo-convex shape in which the above shapes are disposed two-dimensionally and the concavo-convex shape in which they are disposed one-dimensionally, the sectional shape of the convex portions is desirably a triangular shape from the perspective of light-condensing efficiency.

It suffices for the above concavo-convex shape to be present in at least a portion of the interface between the high refractive index layer and the low refractive index layer. When present in one portion, the embodiment in which the concavo-convex shape is present in the center and not present in the outer peripheral portion surrounding the center is desirable from the perspective of light-condensing efficiency on the image display element side. From the perspective of further enhancing light-condensing efficiency, the concavo-convex shape is desirably present over the entire surface of the interface.

The above-described concavo-convex shape can be formed by known molding methods such as transfer methods and pressing methods. By forming a concavo-convex shape on the surface of either the high refractive index layer or the low refractive index layer and forming the other layer on the surface on which the concavo-convex shape has been formed, it is possible to obtain a brightness enhancement film having an interface with a concavo-convex shape. In forming a concavo-convex shape, known techniques relating to the manufacturing of prism sheets can be employed without limitation. In an embodiment, a commercial prism sheet can be employed as a low refractive index layer. More particularly, a lyotropic liquid-crystalline composition can be coated on the surface (exit surface) having a concavo-convex shape of a commercial prism sheet to form a high refractive index layer, thereby yielding a brightness enhancement film with a concavo-convex shape at the interface between the high refractive index layer and the low refractive index layer. When the brightness enhancement film thus formed is employed, the surface that is to be an entering surface (flat surface) as employed as a prism sheet becomes the outermost surface of the low refractive index layer and is disposed on the exit surface side.

In an embodiment, the above brightness enhancement film, in the same manner as a common prism sheet, can be disposed between a backlight unit and an image display element. For example, in a liquid-crystal display device, it can be disposed at a gap from the liquid-crystal panel between the backlight unit and the liquid-crystal panel.

In an embodiment, the brightness enhancement film can be integrally laminated with a polarizer layer, making it possible to obtain a polarizing plate containing the above brightness enhancement film. In this context, the term "integrally laminated" is used to mean so as to exclude the state where that the brightness enhancement film has been simply positioned on the polarizer layer without coating or adhesion. For example, an embodiment in which coating liquids for forming the various layers constituting a brightness enhancement film are coated on the surface of a polarizer layer or on the surface of a film provided on the surface of a polarizer layer to form a brightness enhancement film; an embodiment in which an adhesion-enhancing layer, an adhesive layer, or other intermediate layer bonding two layers is used to tightly bond the surface of a polarizer layer or the surface of a film provided on a polarizer layer and the surface of a brightness enhancement film; an embodiment in which laminate processing employing an adhesive or laminate processing (hot pressing) not employing an adhesive is used to tightly bond the surface of a polarizer layer or the surface of a film provided on a polarizer layer to the surface of a brightness enhancement film; and the like are included in the term "integrally laminated." Integrally laminating the brightness enhancement film with the polarizer layer is desirable from the perspective of enhancing the durability of the image display devices that have been reduced in thickness in recent years. This point will be further described below.

By way of example, a liquid-crystal display device can be comprised of viewing-side and backlight-side polarizing plates, a liquid-crystal panel having a liquid-crystal cell disposed between these polarizing plates, and a backlight unit (also referred to simply as a"backlight"). In the small and medium LCD market—such as tablet terminals and mobile applications—that has grown rapidly in recent years, there has been a high demand for thickness reduction from the perspective of ease of portability. In the large LCD market centered on televisions, as well, reduction in thickness has been required to facilitate transportation and lower transport costs. Under such circumstances, the thickness of the various parts constituting the liquid-crystal panel has been undergoing thickness reduction to reduce the thickness of the liquid-crystal display device. Accompanying this, the durability of the liquid-crystal panel, especially durability under high temperature and elevated humidity, has tended to drop. An example of a phenomenon that has occurred due to this drop in durability is warping of the liquid-crystal panel. This is thought to be primarily due to the absorption of moisture by the polarizer (polarizer layer) contained in the polarizing plate. When the liquid-crystal panel warps to the backlight side, between the liquid-crystal panel and the backlight unit, the prism sheet disposed at a gap from the liquid-crystal panel (an air layer is provided) and the surface of the liquid-crystal panel sometimes come into partial contact. The present inventors presume that this may cause display unevenness on the display surface. The reason that prism sheets have conventionally been disposed between the backlight unit and the liquid-crystal panel is because an irregular shape is formed on the exit surface of the prism sheet, it tends not to adhere to the surface of the liquid-crystal panel and because an air layer may contribute to enhancing brightness. This latter reason will be further described. Since the refractive index of a prism sheet is normally higher than the refractive index of an air layer (about 1.00), the inadequate light-condensing effect achieved with a prism sheet alone may be supplemented by the light-condensing effect of the refractive index difference of the interface between the prism sheet and the air layer.

By contrast, since adequate brightness enhancement can be achieved with the brightness enhancement film according to an aspect of the present invention without an air layer, it can be incorporated into the liquid-crystal panel as a constituent part of the polarizing plate. That makes it possible to prevent partial contact between the liquid-crystal panel surface and the brightness enhancement film due to warping of the liquid-crystal panel. It is also presumed that since the brightness enhancement film that is a separate part from the conventional liquid-crystal panel is made a constituent part of the liquid-crystal panel, it can play a role in reinforcing the strength of the liquid-crystal panel. This is also thought to contribute to inhibiting a drop in durability.

<Method of Manufacturing the Brightness Enhancement Film>

The method of manufacturing the brightness enhancement film according to an aspect of the present invention is not specifically limited beyond that the brightness enhancement film has the structure set forth above. For example, a lyotropic liquid-crystalline composition (coating liquid for forming a high refractive index layer) and a coating liquid for forming a low refractive index layer can be sequentially coated on a surface being coated. Following coating, as needed, they can be subjected to post-processing such as rinsing with water or the like and drying to obtain a brightness enhancement film in which the high refractive index layer and the low refractive index layer are laminated in alternating fashion. When employing a lyotropic liquid-crystalline compound having a polymerizable group, after coating, a polymerization treatment (heating, irradiation with light, or the like) based on the type of polymerizable group can be conducted to form the high refractive index layer as a cured film Following the formation of one layer, the desired concavo-convex shape can be formed on the surface of the layer that has been formed as set forth above by a known molding method such as the transfer method and the pressing method. Subsequently, by forming the other layer, it is possible to form a brightness enhancement film having a concavo-convex shape at the interface. For example, a coating liquid for forming a low refractive index layer in the form of a curable composition can be coated on the surface being coated, after which a concavo-convex roller having a surface shape that is the reverse of the desired concavo-convex shape can be pressed onto the surface being coated to form the concave portions and the convex portions. Next, a curing treatment such as irradiation with light or heat can be conducted to form a concavo-convex shape on the surface of the low refractive index layer.

Various known coating methods can be employed to coat the various coating liquids. Specific examples of coating methods are curtain coating, extrusion coating, roll coating, dip coating, spin coating, print coating, spray coating, slide coating, and the like. Specific examples of coating means are a die coater, blade coater, bar coater, and the like.

For example, in an embodiment, the surface that is coated can be the surface of a polarizer layer constituting a polarizing plate or the surface of a film such as a protective film provided on a polarizer layer. Coating the coating liquid on such a surface and forming a brightness enhancement film makes it possible to fabricate a polarizing plate in which a brightness enhancement film and a polarizer layer have been integrally laminated.

A coating in the form of the brightness enhancement film can be formed on a surface being coated, and the brightness enhancement film can be peeled off the surface being coated and disposed on the surface of a member constituting an image display device by means of an adhesion-enhancing layer or an adhesive layer, or adhered to the surface of a member, to incorporate the brightness enhancement film into an image display device. In that case, the surface being coated that is employed can be a known substrate such as glass or a polymer film, without limitation. Examples of polymer films are cellulose acylate films, acrylic films, norbornene films, and polyester films. However, this is not a limitation. Adhesion-enhancing layers and adhesive layers can also be formed with known adhesives. For example, an adhesion-enhancing layer or adhesive layer can be used to bond the surface of a brightness enhancement film and the surface of a polarizer layer or the surface of a film provided on a polarizer layer to fabricate a polarizing plate in which a brightness enhancement film and a polarizer layer have been integrally laminated.

<Thickness of the Brightness Enhancement Film>

The thickness of the brightness enhancement film is not specifically limited. From the perspective of reducing the thickness of the image display device incorporating the brightness enhancement film, a low thickness is desirable. The thickness is, for example, equal to or less than 40 µm, desirably equal to or less than 30 µm, and preferably equal to or less than 20 µm. From the perspectives of enhancing durability and enhancing the strength of the brightness enhancement film as set forth above, the thickness of the brightness enhancement film is desirably equal to or more than 10 µm, preferably, equal to or more than 15 µm.

In an embodiment of the above-described brightness enhancement film, as set forth above, it can be incorporated as a constituent part of a backlight unit in an image display device. In another embodiment, it can be incorporated as a constituent part of a polarizing plate in an image display device. In both of these embodiments, the outermost surface on the low refractive index layer side that functions as the exit surface for light entering from the backlight unit is a flat surface. The flat surface is as set forth above. The term "outermost surface of the low refractive index layer side" is the outer surface of the low refractive index layer in an embodiment, and is the surface of a film formed on the surface of the low refractive index layer, such as a protective film, in another embodiment. Any film the use of which as a protective film on a polarizing plate, described further below, is known can be employed without limitation as the film. From the perspective of maintaining light-condensing efficiency, the difference in the average refractive index of such a film and that of the low refractive index layer is desirably equal to or less than 0.10, with the smaller the difference in average refractive index with the lower refractive index layer, the better.

Polarizing Plate

The polarizing plate according to an aspect of the present invention contains the above brightness enhancement film and a polarizer layer.

In a liquid crystal display device, a liquid crystal cell is normally disposed between a viewing-side polarizing plate and a backlight-side polarizing plate to construct a liquid crystal panel. The above polarizing plate according to an aspect of the present invention can achieve brightness enhancement by increasing the amount of light entering the liquid crystal cell. Thus, it is desirably used as a backlight-side polarizing plate disposed between the liquid crystal cell and the backlight unit. The above brightness enhancement film is desirably disposed between a polarizer layer and a backlight unit. As set forth above, the above brightness enhancement film can be integrally laminated with the polarizer layer. To achieve light condensing effect, in the above polarizing plate, the brightness enhancement film is disposed so as to position the high refractive index layer and the low refractive index layer in this order from the backlight side to the polarizer layer side.

The above polarizing plate will be described in greater detail below.

<Polarizer Layer>

The polarizers commonly employed in polarizing plates can be employed without limitation as the polarizer layer. As a specific example, a polarizer layer that is obtained by immersing a polyvinyl alcohol film in an iodine solution and stretched can be employed. The thickness of the polarizer layer, for example, falls within a range of 0.5 to 80 µm, but is not specifically limited.

Protective films can be provided on one or both surfaces of the polarizer layer. The various protective films that are commonly employed on polarizing plates can be employed as the protective film without limitation. Specific examples are cellulose resins such as triacetyl cellulose, polyester resin, polyethersulfone resin, polysulfone resin, polycarbonate resin, polyamide resin, polyimide resin, polyolefin resin, acrylic resin, methacrylic resin, cyclic polyolefin resins (norbornene resin), polyallylate resin, polystyrene resin, polyvinyl alcohol resin, and mixtures thereof. At least one phase difference film can be present between the liquid crystal cell and the viewing-side polarizing plate and the backlight-side polarizing plate. For example, a phase difference film can be present as an inner polarizing plate protective film on the liquid crystal cell side. Known cellulose acylate films and the like can be employed as such a phase difference film.

The various films set forth above can be bonded to the polarizer layer and other films through known adhesion-enhancing layers and adhesive layers.

In an embodiment, the above brightness enhancement film can be provided on a film disposed on the polarizer layer. Generally, from the perspectives of workability such as strength and handling, as well as thickness reduction, the thickness of the protective film is about 1 to 500 µm, desirably 1 to 300 µm, more preferably 5 to 200 µm, and still more preferably, 5 to 150 µm. In both the viewing-side polarizing plate and the backlight-side polarizing plate, the polarizer layer can be bonded to the liquid crystal cell without an intervening protective film. The liquid crystal cell (particularly the substrate of the liquid crystal cell) can perform a protective function.

In another embodiment, the above brightness enhancement film can also serve as a protective film. For example, the brightness enhancement film can also serve as the backlight-side protective film of the backlight-side polarizing plate.

Image Display Device

The image display device according to an aspect of the present invention comprises:

an image display element and a backlight unit, and the above brightness enhancement film between the image display element and the backlight unit.

<Brightness Enhancement Film>

As set forth above, in an embodiment, the above brightness enhancement film can be incorporated in the above image display device as a separate part from the polarizing plate.

In an embodiment, the above brightness enhancement film can be contained in the polarizing plate. The details of such a polarizing plate are as set forth above. For example, when the brightness enhancement film is contained in the backlight-side polarizing plate, it is desirably disposed at a position closer to a backlight side than the polarizer layer, for example, as a layer also serving as a backlight-side protective layer.

<Image Display Elements>

Examples of the image display element are the various known image display elements. Specific examples are liquid crystal cells (liquid crystal display elements), organic electroluminescence (EL) elements, and other EL display elements. The drive mode of the liquid crystal cells is not specifically limited. Examples are various modes such as in-plane switching (IPS) mode, fringe field switching (FFS) mode, and vertical alignment (VA) mode.

<Backlight Unit>

The backlight units commonly contained in image display units can be employed without limitation as the backlight unit. The backlight unit normally comprises at least a light source, and normally further comprises a light-guiding plate. The backlight unit can be configured as an edge-light type or direct type.

The above brightness enhancement film can function as a light condensing sheet by condensing light entering the film to the exit surface side. This makes it possible to enhance the brightness of the display surface of the image display device.

EXAMPLES

The present invention will be described more specifically based on Examples below. The materials, quantities employed, ratios, processing contents, processing procedures, and the like that are given in Examples below can be suitably modified without departing from the spirit or scope of the present invention. Accordingly, the scope of the present invention is not to be construed as being limited by the specific examples given below.

Example 1

1. Preparation of Lyotropic Liquid-Crystalline Composition (Coating Liquid)

(1) Synthesis of Lyotropic Liquid-Crystalline Compound

The cesium salt of poly(2,2'-disulfo-4,4'-benzidine-terephthalamide) having the repeating unit indicated below was synthesized by the following method as a lyotropic liquid-crystalline compound.

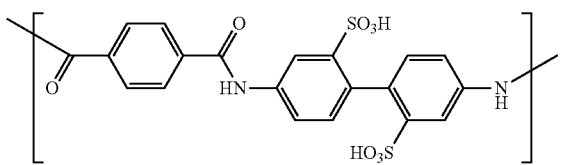

A 1.377 g (0.004 mol) quantity of 4,4'-diaminobiphenyl-2,2'-disulfonic acid was mixed with 1.2 g (0.008 mol) of cesium hydroxide and 40 mL of water and the mixture was stirred in a stirrer until it dissolved. Subsequently, 0.672 g (0.008 mol) of sodium hydrogencarbonate was admixed to the solution. While stirring the solution thus obtained at a stirring rate of 2,500 rpm, a solution of 0.812 g (0.004 mol) of terephthaloyldichloride in anhydrous toluene (15 mL) was gradually added in equal to or less than 5 minutes. Stirring was continued for another five minutes, yielding a viscous white emulsion. The emulsion thus obtained was diluted with 40 mL of water and the stirring speed was reduced to 100 rpm. The reaction product was homogenized, after which 250 mL of acetone was added to induce precipitation. The precipitating compound obtained had a weight average molecular weight of $1.7 \times 10^6$. The weight average molecular weight was determined with an HLC-8120 made by Toso, a column in the form of a TSK gel Multipore HXL-M made by Toso (7.8 mm ID×30.0 cm), and eluent in the form of tetrahydrofuran (THF). The compound was identified by $^1$H-NMR, confirming that the targeted compound had been obtained.

Preparation of Lyotropic Liquid-Crystalline Composition (Coating Liquid)

The lyotropic liquid-crystalline compound synthesized in (1) above was added to pure water to obtain an aqueous solution with a concentration of 10 weight percent (lyotropic liquid-crystalline composition).

A portion of the aqueous solution obtained was collected and coated and dried on a glass substrate at a solution temperature of 90° C. using a bar coater to obtain a coating. The texture of the coating obtained was observed under a polarizing microscope and the presence of an isotropic phase without the expression of a liquid-crystal phase was confirmed.

The lyotropic liquid-crystalline compound synthesized in (1) above was added to pure water to obtain an aqueous solution with a concentration of 10 weight percent.

The aqueous solution obtained was coated and dried on a glass substrate at a solution temperature of 23° C. using a bar coater to obtain a coating. The texture of the coating obtained was observed under a polarizing microscope and the expression of a liquid-crystal phase was confirmed.

Based on the above results, the compound synthesized in (1) above was determined to exhibit lyotropic liquid crystallinity.

2. Preparation of Coating Liquid for Forming Low Refractive Index Layer (UV Curable Composition)

The composition indicated below was charged to a mixing tank and stirred to prepare the coating liquid for forming low refractive index layer.

| | |
|---|---|
| Pentaerythritol tetraacrylate [A-TMMT made by Shin Nakamura Chemical Co., Ltd.] | 100.0 weight parts |
| Boronic acid monomer indicated below | 0.5 weight part |
| Polymerization initiator [Irgacure 127 made by Chiba Special Chemicals] | 3.0 weight parts |
| Methyl ethyl ketone | 103.7 weight parts |

3. Fabrication of a Polarizer Layer with Protective Film on One Side (1) Fabrication of Protective Film (Preparation of Core Layer Cellulose Acylate Dope 1)

The following composition was charged to a mixing tank and stirred. The various components were dissolved to prepare a core layer cellulose acylate dope 1. The molecular weight of compound 1-1 below was the weight average molecular weight determined by the method set forth above.

| | |
|---|---|
| Cellulose acetate with a 2.88 degree of acetyl substitution | 100 weight parts |
| Ester oligomer (compound 1-1) | 10 weight parts |
| Durability enhancer (compound 1-2) | 4 weight parts |

| | |
|---|---|
| UV absorbent (compound 1-3) | 3 weight parts |
| Methylene chloride (first solvent) | 438 weight parts |
| Methanol (second solvent) | 65 weight parts |

(Compound 1-1)

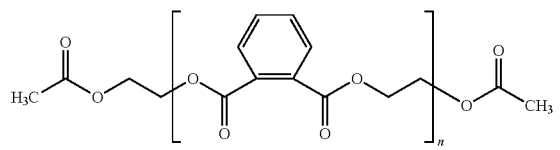

Molecular weight: 100

(Compound 1-2)

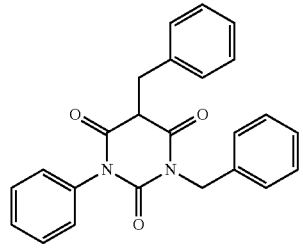

(Compound 1-3)

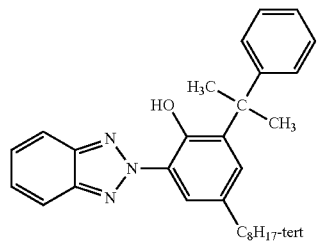

(Preparation of Outer Layer Cellulose Acylate Dope 1

To the above core layer cellulose acylate dope 1 (90 weight parts) was added the following matting agent dispersion 1 (10 weight parts) to prepare an outer layer cellulose acylate dope 1.

| | |
|---|---|
| Silica particles with an average particle size of 20 nm (Aerosil R972, made by Nippon Aerosil) | 2 weight parts |
| Methylene chloride (first solvent) | 76 weight parts |
| Methanol (second solvent) | 11 weight parts |
| Core layer cellulose acylate dope 1 | 1 weight part |

(Preparation of Cellulose Acylate Film)

Three layers consisting of core layer cellulose acylate dope 1 and to each side thereof outer layer cellulose acylate dope 1 were simultaneously caused to flow onto a drum at 20° C. through casting nozzles. In a state of about a 20 weight percent content of solvent, they were peeled off, two edges of the film in a width direction were secured with tenter clips, and the remaining solvent, in a state of 3 to 15 weight percent, was dried while conducting 1.2-fold stretching in a crosswise direction. Subsequently, by means of conveyance between the rolls of a heat treatment device, a cellulose acylate film 25 μm in thickness was fabricated as protective film 01.

(2) Preparation of Polarizer Layer with Protective Film on One Side
(Saponification of Protective Film)

Protective film 01 fabricated in (1) above was immersed for 1 minute in a 4.5 mol/L sodium hydroxide aqueous solution (saponification solution) that had been adjusted to 37° C. The film was then rinsed with water, immersed for 30 seconds in a 0.05 mol/L sulfuric acid aqueous solution, and rinsed again with water. An air knife was then used to drain off the water three times. After removing the water, the film was placed for 15 seconds in a 70° C. drying zone and dried to prepare saponified protective film 01.

(Fabrication of Polarizer Layer)

An elongated polyvinyl alcohol film 75 μm in thickness (9X75RS made by Kuraray) was continuously conveyed by guide rolls, swollen 1.5-fold by immersion in a 30° C. water bath, and stretched at a two-fold stretching rate. It was then dyed by immersion in an iodine and potassium iodide formulation dye bath (30° C.). Along with the dyeing, it was also stretched at a three-fold stretching rate. Next, it was subjected to a crosslinking treatment in an acidic bath (60° C.) to which boric acid and potassium iodide had been added and subjected to a stretching treatment at a 6.5-fold stretching rate. Subsequently, it was dried for 5 minutes at 50° C. to obtain a polarizing film (polarizer layer) 1,330 mm in width and 15 μm in thickness.

(Bonding the Polarizer Layer and Protective Film)

The polarizer layer obtained above and the protective film 01 that had been subjected to the saponification treatment were bonded together roll-to-roll so that the transmission axis of the polarizing film was perpendicular to the longitudinal direction of the protective film using an adhesive in the form of a 3 weight percent aqueous solution of polyvinyl alcohol (PVA-117H made by Kuraray) to fabricate a polarizing plate 01 with a protective film on one side (referred to hereinafter simply as polarizing plate 01).

4. Fabrication of Polarizing Plate with Brightness Enhancement Film

To form the concavo-convex shape regularly and two-dimensionally disposed that is schematically shown in FIG. 1(a), concavo-convex rollers having a surface shape that was the reverse of the shape being forced were fabricated.

The coating liquid for forming a low refractive index (UV curable composition) layer that was prepared in 2. above was coated on the surface of the side of the polarizer layer (polarizing plate 01) with protective film on one side obtained in 3. above on which the protective film had not been formed under conditions of a conveyance rate of 24 m/minute by the die coat method using the slotted die described in Example 1 of Japanese Unexamined Patent Publication (KOKAI) No. 2006-122889, which is expressly incorporated herein by reference in its entirety, and dried for 60 seconds at 60° C. Subsequently, while pressing with the concavo-convex rollers, a 160 W/cm air-cooled metal halide lamp (made by Eye Graphics, Inc.) was used under a nitrogen purge (oxygen concentration about 0.1%) to cure the coating layer by irradiating it with UV radiation at a dose of 390 mJ/cm$^2$ at a luminance of 400 mW/cm$^2$ to fabricate the low refractive index layer (cured layer) having the concavo-convex surface shape shown in FIG. 1(a).

The lyotropic liquid-crystalline composition prepared in 1. above was coated with a bar coater at 90° C. on the surface of the cured layer having the concavo-convex shape, rinsed with water, and dried to form a high refractive index layer (layer comprising a lyotropic liquid-crystalline compound). As set forth above, in the lyotropic liquid-crystalline compound prepared in 1. above, the lyotropic liquid-crystalline compound was present as an isotropic phase at a solution temperature of 90° C.

A portion of the polarizing plate with brightness enhancement film thus obtained was cut away with a microtome to obtain a sample for cross-sectional observation. The concavo-convex shape at the interface between the high refractive index layer and the low refractive index layer in the sample obtained was observed under an optical microscope (ECLIPSE LV100POL made by Nikon). The fact that the quadrangular pyramidal shape shown in FIG. 1(a) had been formed and the fact that θ shown in FIG. 2(a) was 70° and P was 20 μm were confirmed. Observation of the shape and measurement of θ and P can also be conducted by observation using various microscopes (such as observation by scanning electron microscope (SEM)); there is no limitation to an optical microscope.

The cross section was observed by an optical microscope and the total thickness of the brightness enhancement film was determined to be 16 μm.

5. Fabrication of Liquid-Crystal Display Device

A commercial liquid-crystal television (42LA7400 made by LGE) was taken apart, the prism sheet positioned on the backlight unit was removed, the polarizing plate on the backlight side was removed, and the polarizing plate with brightness enhancement film that had been fabricated in Example 1 was bonded in its place with the brightness enhancement film on the backlight side. Subsequently, the liquid-crystal display device was reassembled to obtain the liquid-crystal display device of Example 1.

Example 2

The concavo-convex rollers used to form the concavo-convex shape on the surface of the low refractive index layer were changed. Concavo-convex rollers having the surface shape that was the reverse of the shape being formed were fabricated to form the concavo-convex shape schematically shown in FIG. 1(b) regularly and two-dimensionally disposed.

With the exception that the concavo-convex rollers thus fabricated were employed, a polarizing plate with brightness enhancement film and a liquid-crystal display device equipped with this polarizing plate were obtained by the same methods as in Example 1.

In the same manner as in Example 1, a sample was cut out for sectional observation. The sample was then used to observe the concavo-convex shape at the interface of the high refractive index layer and low refractive index layer in the same manner as in Example 1. The fact that a semi-spheroid shape such as that shown in FIG. 1(b) had been formed and that θ shown in FIG. 2(b) was 60° and P was 20 μm were confirmed.

Based on the sectional observation by an optical microscope, the total thickness of the brightness enhancement film was determined to be 19 μm.

Example 3

Instead of on the surface of a polarizer layer, a low refractive index layer was formed on the surface of a commercial triacetyl cellulose (TAC) film (FUJITAC TD40UL (40 μm film thickness, with an average refractive index as measured with a DR-M2 multi-wavelength Abbe refractometer made by Atago of 1.48, made by FUJIFILM). A concavo-convex shape was formed on the surface of the low refractive index layer, followed by a high refractive index layer, yielding a brightness enhancement film sequentially comprising a high refractive index layer, low refractive index layer, and TAC film.

A commercial liquid-crystal television (42LA7400 made by LGE) was taken apart, and the prism sheet positioned on the backlight unit was replaced with the brightness enhancement film that had been prepared, disposed such that the order from the backlight side toward the air layer was high refractive index layer, low refractive index layer, TAC film. Subsequently, the liquid-crystal display device was reassembled to obtain the liquid-crystal display device of Example 3.

Example 4

With the exception that the concavo-convex shape was formed on the surface of the low refractive index layer in the same manner as in Example 2, a brightness enhancement film and liquid-crystal display device were obtained in the same manner as in Example 3.

The brightness enhancement films fabricated in Examples 1 and 2 above were separated from the polarizer layers. A no surface contact, layer sectional contour measuring system VertScan (made by Ryoka Systems, Inc.) was used to measure the Ra of the surface of the low refractive index layer, revealing a value of 0.10 μm for Example 1 and 0.08 μm for Example 2.

Measurement identical to that above of the Ra of the TAC film surface, which was the outermost surface on the low refractive index layer side, in the brightness enhancement films fabricated in Examples 3 and 4 revealed a value of 0.09 μm for Example 3 and a value of 0.08 μm for Example 4.

Based on the above results, the brightness enhancement films fabricated in Examples 1 to 4 were found to be flat surfaces with low refractive index layer side outermost surface Ra values of equal to or less than 0.25 μm.

6. Evaluation of Brightness Enhancement Film (1) White Brightness Evaluation

The brightness was measured with a color brightness meter BM-5 (made by Topcon) from directly in front and at a lateral ultra corner of 45° with the liquid-crystal display device fabricated above in a white display state. The brightness of a commercial liquid-crystal television (42LA7400 made by LGE) (referred to hereinafter as Comparative Example 1) was similarly measured. Denoting the front brightness of the liquid-crystal display device of Comparative Example 1 as 100, the front brightness and the brightness at a lateral ultra corner of 45° of the liquid-crystal display devices of Examples 1 to 4 and the brightness at a lateral ultra corner of 45° of the liquid-crystal display device of Comparative Example 1 were obtained as relative values. The results are given in Table 1.

TABLE 1

|  | Comparative Example 1 | Example 1 | Example 2 | Example 3 | Example 4 |
|---|---|---|---|---|---|
| Front brightness | 100 | 158 | 112 | 152 | 108 |
| Brightness at a lateral ultra corner of 45° | 0 | 18 | 24 | 17 | 23 |

As shown in Table 1, the liquid-crystal display device of Comparative Example 1 equipped with a commercial prism sheet exhibited a drop in brightness at a lateral ultra corner of 45°. By contrast, the liquid-crystal display devices of Examples 1 to 4 did not exhibit loss of brightness at a lateral ultra corner of 45°.

Examples 1 to 4 achieved enhanced front brightness over Comparative Example 1.

Based on the results in Table 1, in the concavo-convex shapes formed on the interfaces between the high refractive index layer and low refractive index layer in the brightness enhancement films, the liquid-crystal display devices of Examples 1 to 3, which had convex portions with triangular cross sections, a greater brightness enhancement effect was observed than in Examples 2 and 4.

A comparison of Examples 1 and 3 and Examples 2 and 4 can reveal that in Example 1, in which the brightness enhancement film was incorporated into the polarizing plate (the polarizer layer and brightness enhancement film were integrally laminated), a greater brightness enhancement effect was observed than in Example 3, and likewise in Example 2 relative to Example 4. The present inventors presume that because the brightness enhancement film was directly laminated onto the polarizer layer in Examples 1 and 2, there was no scattering due to an air layer.

(2) Measurement of Refractive Index and Calculation of Average Refractive Index

A sample in which a high refractive index layer was formed on a glass substrate to the same thickness as the high refractive index layer contained in the brightness enhancement film, and a sample in which a low refractive index layer was formed on a glass substrate to the same thickness as the low refractive index layer contained in the brightness enhancement film, were prepared by the same method as in Example 1.

The refractive indexes for light of 550 nm wavelength were measured with a DR-M2 multi-wavelength Abbe refractometer made by Atago in the in-plane and thickness directions of the high refractive index layer and low refractive index layer using each sample, and the average values were calculated. The average refractive index for the high refractive index layer was 2.20 and the refractive index of the low refractive index layer was 1.50.

7. Evaluation of Durability

The liquid-crystal display devices fabricated in Examples 1 to 4 and the liquid-crystal display device fabricated in Comparative Example 1 were placed in individual enclosures for three days in an environment of 50° C. and 80% relative humidity. Subsequently, they were left continuously on for two days in an environment of 25° C. and 60% relative humidity, and the unevenness was visually evaluated from the front in a black display state. As a result of the evaluation, intense unevenness was generated in the vicinity of the four corners of the display screen of Comparative Example 1. In Examples 1 and 2, no unevenness was observed. In Examples 3 and 4, there was some unevenness, but it was extremely weak and difficult to recognize. In the liquid-crystal display devices of Examples 3 and 4, since the surface on the liquid-crystal panel side of the brightness enhancement film (the surface on the low refractive index layer side) was a flat surface, compared to the prism sheet contained in the liquid-crystal display device of Comparative Example 1 (having a concavo-convex shape formed on the surface on the liquid-crystal panel side), the present inventors presume the reason to be that there was less of a chance of coming into contact with the liquid-crystal panel surface when warping occurred. A cross section cut out of the prism sheet contained in the liquid-crystal display device of Comparative Example 1 and observed under an optical microscope (ECLIPSE LV100POL made by Nikon) revealed that on the surface on the liquid-crystal side, a concavo-convex shape containing multiple triangular prism shapes disposed in parallel (in one dimension) had been formed, and that the distance between the bottoms of the concave portions of two adjacent concave portions separated by the convex portion was 20 µm. The inner angle at a tip of the convex portion of a triangle formed by connecting the tip of the convex portion and the bottoms of the concave portions of two adjacent concave portions being separated by the convex portion was 90°.

An aspect of the present invention is useful in the field of manufacturing various image display devices such as liquid crystal display devices.

The present disclosure relates to the subject matter contained in Japanese Patent Application No. 2014-080597 filed on Apr. 9, 2014, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A brightness enhancement film, wherein
a high refractive index layer and a low refractive index layer with an average refractive index that is lower than that of the high refractive index layer are directly laminated, and
which comprises a concavo-convex shape comprised of concave portions and convex portions in an interface shape of an interface between the high refractive index layer and the low refractive layer, with the high refractive index layer comprising a lyotropic liquid-crystalline compound, and an outermost surface on the low refractive index layer side being a flat surface.

2. The brightness enhancement film according to claim 1, wherein an average refractive index of the high refractive index layer is equal to or higher than 1.80 but equal to or less than 2.50.

3. The brightness enhancement film according to claim 1, wherein, in the concavo-convex shape, a distance between bottoms of the concave portions of two adjacent concave portions separated by the convex portion ranges from 1 to 200 µm, and an inner angle at a tip of the convex portion of a triangle formed by connecting the tip of the convex portion and the bottoms of the concave portions of two adjacent concave portions being separated by the convex portion ranges from 50 to 100°.

4. The brightness enhancement film according to claim 1, wherein an average refractive index of the low refractive index layer is equal to or higher than 1.00 but less than 1.80.

5. The brightness enhancement film according to claim 1, wherein an average refractive index difference between the high refractive index layer and the low refractive index layer is equal to or higher than 0.05.

6. The brightness enhancement film according to claim 1, wherein the low refractive index layer is a cured layer formed of a curable composition.

7. The brightness enhancement film according to claim 1, wherein the concavo-convex shape is formed by two-dimensionally disposing, on the interface, a shape selected from the group consisting of a polygonal pyramid shape, a conical shape, a partial spheroid shape, and a partial spherical shape.

8. The brightness enhancement film according to claim 1, wherein the concavo-convex shape is formed by one-dimensionally disposing, on the interface, a shape selected from the group consisting of a partial cylindrical shape, a partial elliptical cylinder shape, and a prismatic shape.

9. The brightness enhancement film according to claim 1, wherein, in the concavo-convex shape, a sectional shape of convex portions is a triangular shape.

10. A polarizing plate, which comprises:
a brightness enhancement film, and
a polarizer layer, wherein
the brightness enhancement film is a brightness enhancement film wherein a high refractive index layer and a low refractive index layer with an average refractive index that is lower than that of the high refractive index layer are directly laminated, and which comprises a concavo-convex shape comprised of concave portions and convex portions in an interface shape of an interface between the high refractive index layer and the low refractive layer, with the high refractive index layer comprising a lyotropic liquid-crystalline compound, and an outermost surface on the low refractive index layer side being a flat surface.

11. The polarizing plate according to claim 10, wherein, in the brightness enhancement film, an average refractive index of the high refractive index layer is equal to or higher than 1.80 but equal to or less than 2.50.

12. The polarizing plate according to claim 10, wherein, in the concavo-convex shape, a distance between bottoms of the concave portions of two adjacent concave portions separated by the convex portion ranges from 1 to 200 μm, and an inner angle at a tip of the convex portion of a triangle formed by connecting the tip of the convex portion and the bottoms of the concave portions of two adjacent concave portions being separated by the convex portion ranges from 50 to 100°.

13. The polarizing plate according to claim 10, wherein, in the brightness enhancement film, an average refractive index of the low refractive index layer is equal to or higher than 1.00 but less than 1.80.

14. The polarizing plate according to claim 10, wherein, in the brightness enhancement film, an average refractive index difference between the high refractive index layer and the low refractive index layer is equal to or higher than 0.05.

15. The polarizing plate according to claim 10, wherein, in the brightness enhancement film, the concavo-convex shape is formed by two-dimensionally disposing, on the interface, a shape selected from the group consisting of a polygonal pyramid shape, a conical shape, a partial spheroid shape, and a partial spherical shape.

16. The polarizing plate according to claim 10, wherein, in the brightness enhancement film, the concavo-convex shape is formed by one-dimensionally disposing, on the interface, a shape selected from the group consisting of a partial cylindrical shape, a partial elliptical cylinder shape, and a prismatic shape.

17. The polarizing plate according to claim 10, wherein, in the concavo-convex shape, a sectional shape of convex portions is a triangular shape.

18. An image display device, which comprises:
an image display element,
a backlight unit, and
a brightness enhancement film between the image display element and the backlight unit, wherein
the brightness enhancement film is a brightness enhancement film wherein a high refractive index layer and a low refractive index layer with an average refractive index that is lower than that of the high refractive index layer are directly laminated, and which contains a concavo-convex shape comprised of concave portions and convex portions in an interface shape of an interface between the high refractive index layer and the low refractive layer, with the high refractive index layer comprising a lyotropic liquid-crystalline compound, and an outermost surface on the low refractive index layer side being a flat surface.

19. The image display device according to claim 18, wherein
the image display element is a liquid crystal cell positioned between a viewing-side polarizing plate and a backlight-side polarizing plate, with the backlight-side polarizing plate comprising a polarizer layer and the brightness enhancement film.

20. The image display device according to claim 19, wherein
the brightness enhancement film is comprised at a position closer to a backlight side than the polarizer layer in the backlight-side polarizing plate.

* * * * *